United States Patent [19]

Ellin et al.

[11] 4,045,806
[45] Aug. 30, 1977

[54] EXTENDED RANGE EXPOSURE CONTROL SYSTEM

[75] Inventors: Seymour Ellin, Brookline; John R. Sharp, Squantum, both of Mass.

[73] Assignee: Polaroid Corporation, Cambridge, Mass.

[21] Appl. No.: 716,362

[22] Filed: Aug. 23, 1976

[51] Int. Cl.² ............................ G03B 7/00; G03B 9/04
[52] U.S. Cl. ....................................... 354/37; 354/38; 354/51; 354/273
[58] Field of Search ................... 354/36, 37, 38, 49, 354/50, 51, 270, 273, 289

[56] References Cited

U.S. PATENT DOCUMENTS

| 3,205,797 | 9/1965 | Land et al. | 354/38 |
| 3,446,128 | 5/1969 | Dietz | 354/36 |
| 3,890,625 | 6/1975 | Yoshio et al. | 354/51 |
| 3,906,526 | 9/1975 | Toyoshima et al. | 354/289 X |
| Re. 26,627 | 7/1969 | Burgarella et al. | 354/51 |

Primary Examiner—L. T. Hix
Assistant Examiner—Michael L. Gellner
Attorney, Agent, or Firm—David R. Thornton

[57] ABSTRACT

An extended range exposure control system for photographic cameras having an aperture plate slidably movable from a first position in which it stops down the maximum relative aperture of the camera lens to second and third positions in which a photographic circuit is altered while the maximum relative lens aperture is maintained. A shutter mechanism controlled by a light sensitive circuit includes a switch actuated by movement of the aperture plate to the third position to shift the light level sensitivity range of the circuit thereby accommodating shutter speeds necessary to effect exposure of relatively fast film at maximum relative lens aperture. The aperture plate is slidably supported within a housing for the shutter and the respective positions thereof made clearly visible as a result of indicia on the exterior of the housing.

8 Claims, 6 Drawing Figures

EXTENDED RANGE EXPOSURE CONTROL SYSTEM

BACKGROUND OF THE INVENTION

This invention relates to exposure control systems for photographic cameras and more particularly, concerns improvements in such control systems by which the useful range of a camera may be economically extended to provide automatic exposure of high-speed film at low levels of non-transient light without comprising an existing capability for exposing high and low speed films by natural light or by flash.

Light sensitive electronic timing circuits for controlling shutter speeds are extensively used in photographic cameras ranging from the most sophisticated professional varieties to extremely low-cost cameras most commonly used by amateurs. In this latter class of cameras, the least expensive models are capable of use with only one speed of film and equipped with one lens aperture, thus leaving the automatic shutter as the only variable exposure parameter for accommodating variations in scene light levels. In more sophisticated exposure control systems of the type disclosed, for example, in U.S. Pat. No. 3,205,797 issued Sept. 14, 1965 to E. H. Land et al. and in U.S. Reissue Pat. No. 26,627 issued July 15, 1969 (original No. 3,205,803, issued Sept. 14, 1965) to John P. Burgarella et al, both of which are assigned to the assignee of the present invention, the combination of shutter timing circuits is correlated with adjustable lens aperture stops to accommodate widely varying film speeds as well as wide ranges of scene light levels at which the respective films may be exposed.

To provide the amateur photographer with a choice of relatively low-speed (ASA 75) color film, or of relatively high-speed (ASA 3000) black and white film, low-cost cameras are presently available in which a single shutter timing circuit is adapted to either film by means of an aperture plate slidable between two positions so as to provide a relatively small diaphragm stop for the fast black and white film and a maximum relative lens aperture for the slow color film. As a result of the diaphragm stop adjustment for film speed, the light level variation of a scene to be photographed will be accommodated by the automatic shutter within the normal daylight range of illumination for scenes out of doors. Also such cameras may be provided with a flash illumination capability as a result of a switch actuated by the insertion of a flash bulb and operable to alter the light sensitive timing circuit components to provide a maximum flast shutter time of 200 ms.

Now, the speed of the black and white film renders such films suitable for rapid exposure in relatively dim light, however, the exposure parameters available in the above noted cameras are exceeded under such conditions. Hence, it is desirable to provide the latter capability in cameras of the above type while retaining compactness and economy.

Consequently, the objects of the present invention are therefore: the provision of an exposure control system for photographic cameras in which automatic shutter circuit sensitivity to scene illumination is extended to include an additional level of transient light; the provision of such an exposure control system for existing camera constructions with a minimum modification of existing components and at a minimum of expense; and the provision of such an exposure control system which facilitates the indication of camera operating mode to the user of the camera.

SUMMARY OF THE PRESENT INVENTION

In accordance with the present invention, the exposure control system for photographic cameras of the type having a slidable aperture plate is extended to provide a low light exposure capability for relatively fast ASA 3000 black and white film by providing a slidable aperture plate arrangement with an additional position in which the maximum relative lens aperture is maintained and in conjunction with a switch by which the timing circuit is altered to provide shutter speeds suitable for proper exposion of the fast film at the maximum relative lens aperture. The shutter housing, in which the aperture plate is slidably mounted, is provided with appropriate indicia to provide the camera operator with an indication of the operating mode to which the camera is adjusted. All other operating capabilities of the camera are retained without modification of existing components.

Other objects and further scope of applicability of the present invention will become apparent to those skilled in the art as a result of the detailed description to follow taken in conjunction with the accompanying drawings in which like reference numerals designate like parts.

DETAILED DESCRIPTION OF THE PREFERRED EMBODIMENT

Figure 1:
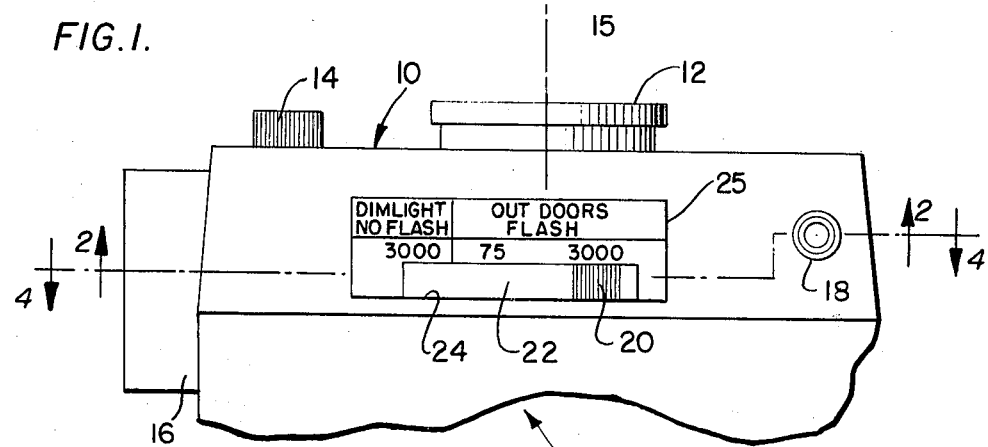
FIG. 1 is a plan view of the top surface of a camera incorporating the exposure control apparatus of the present invention in which an aperture plate may assume three positions.

In the drawings, the reference numeral 10 generally designates the shutter housing which constitutes a module to be assembled with a camera body partially shown at 11. The shutter housing 10 carries in its front wall an objective lens 12 and a photocell lens or window 14. Preferably, the lens 12 is an adjustable lens designed to focus image-carrying light rays from the scene to be photographed along an optical path 15 to the camera focal plane (not shown). A flash cube socket 16 is supported on one side of the housing and a shutter actuating plunger 18 is located in the top wall of the housing on the side thereof opposite from the flash cube socket 16. Also presented in the top wall of the housing 10 is an aperture plate adjusting button 20 projecting from a slide 22 and movable in a slot 24 adjacent to button positioning indicia 25. In particular, indicia 25 presents three alternative position settings of the button 20; that is, the numerals 75 and 3000 under the legend "Outdoors Flash" indicate two film speed positions while the numeral 3000 under the legend "Dim Light No Flash" indicates the third.

Figure 2:
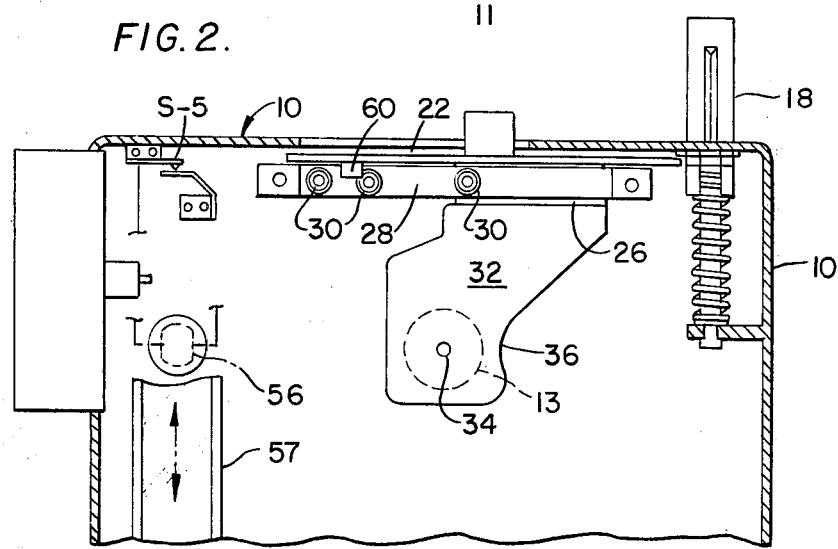
FIGS. 2, 2A and 2B are fragmentary cross-sectional views taken on line 2—2 of FIG. 1 and illustrating the aperture plate of the invention in three positions, respectively.

The indicia 25 thus indicates an appropriate setting of the button 20 for different films with which the shutter housing is intended to be used as well as lighting conditions under which the respective films are to be exposed. Specifically, the button 20 is positioned adjacent the numeral 3000 under "Outdoors/Flash" (as shown in FIGS. 1 and 2) when the camera incorporating the housing 10 is charged with fast film having the speed ASA 3000 and the subject to be exposed is illuminated either by relatively high level outdoor light or by transient light emanating from a flast cube (not shown) in the socket 16. Similarly, when slower film having a speed of ASA 75 is to be exposed by either outdoor light or flash, the button 20 is moved to the left of its position shown in FIG. 2 so as to be adjacent the number 75 under the same legend. Finally, where the relatively high speed ASA 3000 film is to be exposed under dim lighting conditions (i.e., indoors) but with no flash, the button 20 is positioned still further left of its position shown in FIG. 1 so as to be adjacent the numeral 3000 under the legend "Dim Light No Flash."

As shown in FIG. 2, the slide 22 has a depending flange 26 positioned behind an elongated detent spring 28; the latter having three detent projections or dimples 30 which cooperate with a depression (not shown) in the flange 26 for facilitating adjustment of the buttom 20 to each of the three positions described above with respect to the indicia 25, and for then maintaining the adjusted position of the button and slide 24 at the selected location. An aperture plate 32 is supported from the flange 26 and extends downwardly within the housing 10 to cover the inner end 13 of the objective lens 12. The plate 32 is provided with a small central diaphragm opening 34 to effect an aperture stop of $f/60$ for the lens 12. Thus when the button 20 is positioned adjacent the numeral 3000 under the legend "Outdoors Flash," the aperture plate 32 is in a first or "stop-down" position, as shown in FIG. 2, in which the opening 34 stops the lens to $f/60$ because light passing through the lens 12 is restricted to the size of the aperture 34.

Figure 2A:
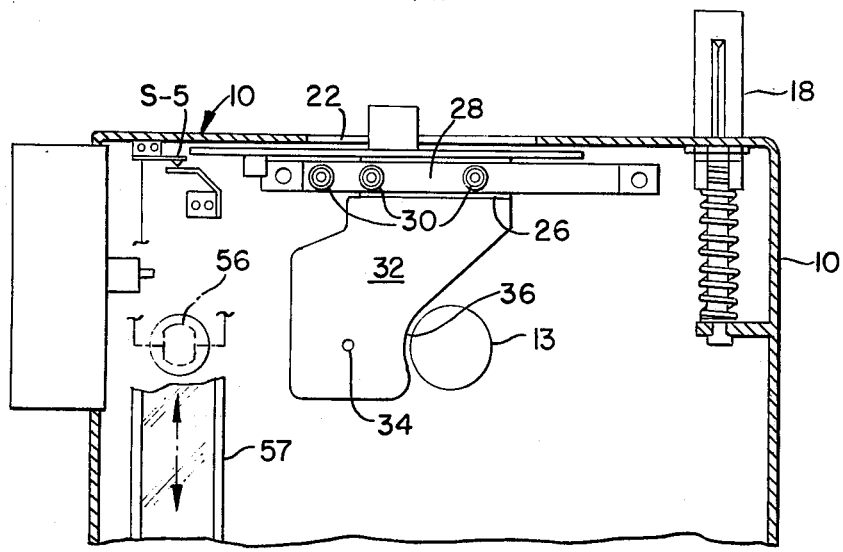

The right hand side of the plate 32 as seen in FIG. 2 is provided with a circular recessed formation 36 such that when the button 20 is moved to the number 75 under the legend "Outdoors Flash" and the aperture plate 32 correspondingly moved to its second or "non-stopping" position shown in FIG. 2A, the rear 13 of the lens 12 is completely uncovered and defines a maximum relative aperture, e.g., $f/9.25$. It will be apparent therefore, that with the relatively fast ASA 3000 film, an aperture stop of $f/60$ is used whereas with the relatively slow ASA 75 film, the aperture stop is increased in size to $f/9.25$.

Figure 2B:
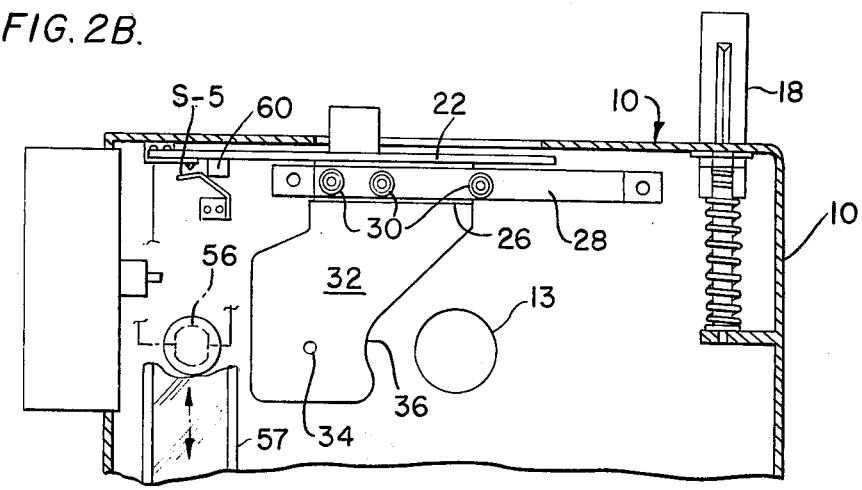

Additionally, the maximum relative aperture stop is maintained upon still further movement of the aperture plate 32 to the left of its position shown in FIG. 2A to a third position shown in FIG. 2B. This latter position of the plate 32, slide 22 and button 20, as mentioned above, applies to the exposure of ASA 3000 film under conditions of low light levels and will be subsequently described in more detail.

Figure 4:
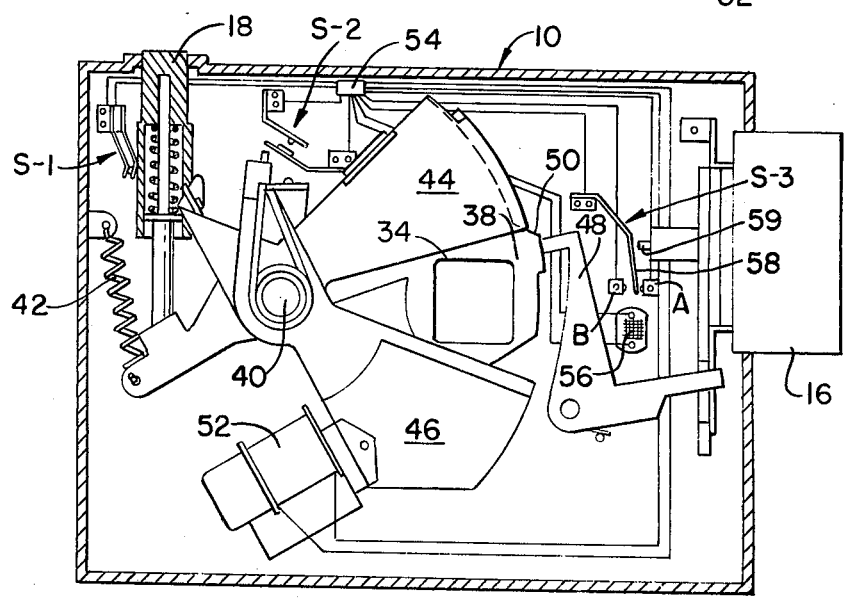
FIG. 4 is a cross-section taken on line 4—4 of FIG. 1 to illustrate the shutter components of the invention.

The shutter mechanism employed in the exposure control system of the present invention is essentially the same as that disclosed in U.S. Pat. No. 3,522,765 issued Aug. 4, 1970 to Bruce K. Johnson et al and is therefore illustrated only generally in FIG. 4 of the drawings. To simplify the illustration and identification of the shutter components, they are shown in FIG. 4 as they would be when the shutter is opened. As thus shown in FIG. 4, the shutter includes, in addition to the actuating plunger 18, a capping blade 38 which is pivotal about a pin 40 upon manual depression of the plunger 18 against the bias of a tension spring 42, an opening blade 44 and a closing blade 46; the latter blades also being supported for pivotal movement on the pin 40 along with the capping blade 38. Inasmuch as the operation of this shutter is fully explained in the aforementioned U.S. Patent, it will suffice for purposes of the present invention to note that upon depression of the plunger 18, the capping blade 38 is pivoted to its open position shown in FIG. 4 wherein its aperture 34 uncovers the rear of the objective lens 12. During such movement of the capping blade 38, a spring bias is imposed on the opening blade 44 while this blade is retained in a closed position by a pivotal latch 48. As the plunger is depressed to its lowermost position as shown, terminal movement of the capping blade 38 will result in a cam surface 50 on the capping blade releasing the latch 48 to allow the opening blade 44 to move very rapidly to its open position. The closing blade 46, also placed under a spring bias towards its closing position by movement of the capping blade 38, is retained for an exposure time interval by an electromagnet 52, the latter being controlled by a circuit module 56, whose operation will be subsequently described in more detail below.

In accordance with the disclosure of the above mentioned U.S. Patent, the electromagnet 52 is initially energized to retain the closure blade 46 in its open position as shown in FIG. 4 and de-energized after a duration of time to allow the shutter closing blade 46 to move to a closed position terminating the exposure interval. Subsequent release of the plunger 18 will then allow both the opening blade 44 and the closing blade 46 to be returned to their original position along with the capping blade 38 under the return force of the tension spring 42 without passage of light through the shutter.

The $f/60$ and $f/9.25$ aperture are selected so that under similar lighting conditions the same shutter speed or exposure interval is applicable to the exposure of either the relatively fast ASA 3000 film or the relatively slow ASA 75 film by moving the aperture plate 32 respectively between the first and the second position shown in FIGS. 2 and 2A to adjust the camera aperture. Inasmuch as movement of the aperture plate in this manner provides control of the camera aperture in the disclosed embodiment, variation in scene light levels under which either of these films is exposed also requires regulation of shutter speed or that is, the time interval between movement of the opening blade 44 to the position illustrated in FIG. 4 and movement of the closing blade 46 from the position illustrated in FIG. 4 to a closed or light sealing positional relationship (not shown) with the opening blade 44.

It will be noted by reference to FIG. 4 that operation of the respective shutter components, in addition to effecting an exposure interval, bring about actuation of a pair of switches designated $S_1$ and $S_2$ connected electrically with a circuit module 54 to be subsequently described in detail with reference to FIG. 3. The switch $S_1$ is a normally open switch which is closed upon initial depressing movement of the shutter plunger 18. The switch $S_2$, on the other hand, is a normally closed switch which is moved to an open position by the opening blade 44 reaching its fully open position as shown in FIG. 4 of the drawing. It will be seen, therefore, that upon actuation of the plunger 18, the switch $S_1$ will be first closed and the switch $S_2$ then opened, but the latter only after the plunger has been fully depressed to release the opening blade 44 for movement to its open position.

The circuit module 54, as shown in FIG. 4, is also connected with a photoconductive cell 56 to render the circuit module light sensitive. It will be seen in FIGS. 1 and 2, for example, that the cell 56 is physically positioned behind the window 14 so that light reflected from a subject to be photographed through the lens 12 will pass also through the window to the cell 56. A variable light attenuating filter 57 is positioned slidably in front of the cell 56 to regulate the effective sensitivity of the cell in a manner known in the art.

Also shown in FIG. 4 is a single pole, double throw switch $S_3$ in which circuit continuity is established between a conductive spring arm 58 and either a contact A or a contact B. The arm 58 of the switch $S_3$ is positioned in the path of a plunger 59 forming part of the flash cube receptacle 16 and operative such that the blade of the switch $S_3$ will be normally in contact with the terminal A whereas insertion of a flast cube (not shown) into the receptacle 16 will move the arm 58 out of contact with the contact A into contact with the contact B.

An additional normally closed switch $S_5$ is shown in FIGS. 2–2B of the drawing and positioned to be actuated from its normally closed condition to an open condition by a depending lug 60 on the slide 22. It will be seen by a comparison of FIGS. 2 and 2A with FIG. 2B that the switch $S_5$ remains in a closed condition with the aperture plate 32 located in either its first (stop-down) position (FIG. 2) or its second position (FIG. 2A) but is opened when the plate is moved to its third position, as shown in FIG. 2B, where the button 20 is positioned adjacent the number 3000 under the legend "Dim Light No Flash."

Figure 3:
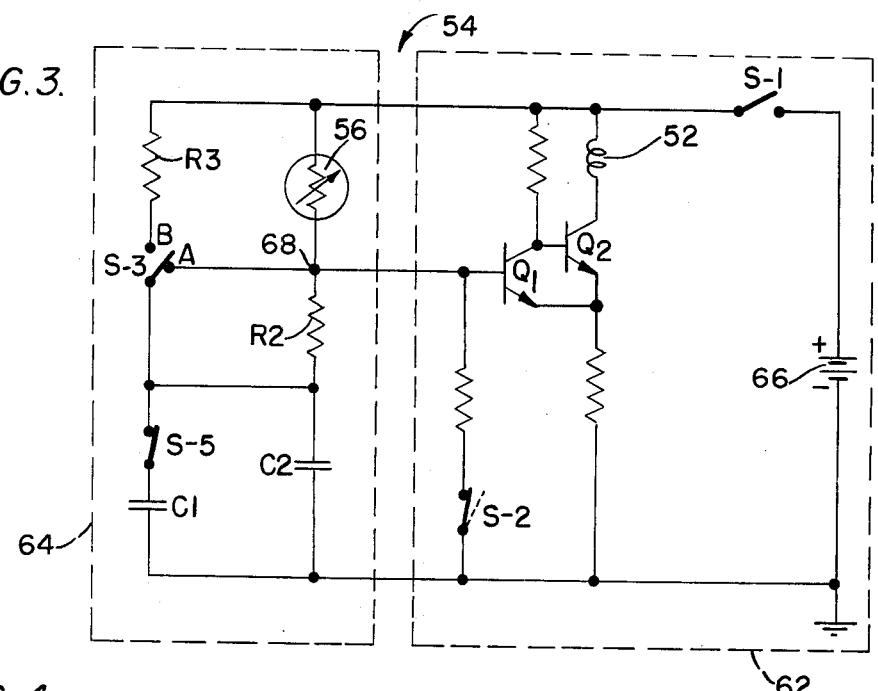
FIG. 3 is a circuit diagram illustrating the interconnection of electrical components of the exposure control system of the present invention.

Turning now to FIG. 3, of the drawings, the circuit module 54 is shown diagramatically to include a trigger circuit 62 and an RC timing network 64. Basically the trigger circuit 62 is shown as including both the switches $S_1$ and $S_2$ the solenoid 52 as well as a pair of transistors $Q_1$ and $Q_2$ and a power source or battery 66. Since the complete operation of the trigger circuit 62 is described in the aforementioned U.S. Pat. No. 3,522,765, it will suffice for purposes of a complete understanding of the present invention to note simply that closure of the switch $S_1$ upon initial depression of the shutter plunger 18 causes the transistor $Q_2$ to conduct and thus energize the coil of the solenoid 52 to retain the closing blade 46 in its open condition upon continued depression of the plunger 18. Grounding of the transistor $Q_1$ through the normally closed switch $S_2$ at this portion of the exposure cycle prevents a forward bias on this transistor. Actuation of the switch $S_2$ from its normally closed to an open position upon movement of the opening blade 44 to its open position, allows the RC timing network 64 to generate a voltage at a junction 68 which builds to a trigger voltage in a period of time (known in the art as a "trigger generation time") which is dependent on the resistance-capacitance values of the timing network 64. When the trigger voltage is reached, the conduction state of the transistors shifts rapidly from the transistor $Q_2$ to the transistor $Q_1$, breaking the circuit through the solenoid 52 and thus allowing the closing blade 46 to move to its light sealing closed position against the opening blade 44.

Since the novel system is intended for low light level operation, the sensitivity of the trigger circuit must be made high, i.e., by providing transistors having high Beta or preferably by substituting a conventional integrated Schmitt trigger circuit of high impedance for the $Q_1$ and $Q_2$ transistor arrangement.

Turning now to the network 64 which is shown as including the photoconductive cell 56, the latter representing a resistance which decreases in value upon exposure to increasing quantities of light, fixed resistors $R_2$ and $R_3$, a relatively large capacitor $C_1$ (e.g., 1.5 microfarads) and a relatively low value capacitor $C_2$ (e.g., 0.047 microfarads) which are connected in parallel when the $S_5$ switch is closed.

In the operation of the exposure control system to expose either ASA 3000 film or ASA 75 film in nontransient, relatively high level light (outdoor light), the switch $S_5$ will be closed due to the position of the slide 22 whereas the arm 5 of the switch $S_3$ will be engaged with contact A to place both the capacitors $C_1$ and $C_2$ in circuit with the photoconductive cell 56. Accordingly, the shutter timing interval will be varied solely as a function of the resistance value of the cell 56; with the relative speeds of the two films being accounted for by the aperture stop adjustment determined by the position of the aperture plate 32 as described above. When either of these two films is to be exposed by transient light emanating from a flash cube inserted into the socket 16, the arm 58 of switch $S_3$ engages contact B to shunt the cell 56 through the resistance $R_3$. In this condition, the timing network 64 operates to effect maximum shutter time for conditions where the reflected flash light and hence, when using a flash for illumination of the subject to be photographed, the relative sensitivity or speed of the respective films mentioned is accounted for again principally by the respective positions of the aperture plate shown in FIGS. 2 and 2A of the drawings.

As previously indicated, an important facility provided by the exposure control system of the present invention is that of accommodating exposure parameters required to use the relatively fast ASA 3000 film under low light levels without the use of flash. These parameters are accomplished in accordance with the present invention simply by adjusting the button 22 to the extreme left hand position as shown in FIG. 2B of the drawings. Such movement opens the switch $S_5$ to switch out the relatively large capacitor $C_1$ while it maintains the aperture of the lens at $f/9.25$. The reduction of the circuit capacitance in the timing network 64 decreases the exposure interval for a given scene light level to thereby accommodate the relatively fast film at the maximum aperture stop.

It will be understood, therefore, that the switch $S_5$ operates to provide two ranges of light sensitivity in the circuit 54; specifically a first range providing a relatively long exposure interval for a given light level thereby achieving proper exposure parameters for the respective fast and slow films in conjunction with the lens aperture stops determined by the respective first and second positions of the aperture plate and a second such range providing a relative short exposure interval for a given light level thereby applicable to the maximum relative lens aperture and the high speed ASA 3000 film. Hence, the switch $S_5$ effectively switches the $C_1$ capacitor out of the timing network in accordance with movement of the slider aperture plate to its third position and thereby alters the correspondence between exposure interval and scene light level from the first sensitivity range to the second sensitivity range which accommodates the fast film at the maximum camera aperture. Also the switch $S_3$ has the effect of adjusting the circuit to provide a maximum exposure interval.

Thus it will be seen that by this invention there is provided a highly automated and yet simple and low-cost exposure control system by which the operating range of a camera with which the lens housing 10 is used may be significantly extended. Also, it will be understood that modifications and/or changes can be made in the disclosed embodiment without departure from the inventive concept manifested by that embodiment. It is expressly intended, therefore, that the foregoing description is illustrative of a preferred embodiment only, not limiting and that the true spirit and scope of the present invention be determined by reference to the appended claims.

What is claimed is:

1. An exposure control system for a photographic camera for exposing either a relatively fast or a relatively slow photographic film, said system comprising:
    a housng having means for mounting an objective lens to direct image-carrying rays from the scene to be photographed along a given optical path within said housing said mounting means including means for defining a maximum relative aperture of said lens;
    an aperture plate having a diaphragm opening therein;
    means for mounting said aperture plate for slideable movement transversely of said given path between a first position wherein said diaphragm is located in a stop-down position in said given path and second and third positions wherein said plate is displaced out of said path such that said maximum relative aperture of said lens is maintained;
    a shutter operably positioned relative to said given path for selectively unblocking and blocking said path thereby defining an exposure interval during which light scene is transmitted along said path;
    a light responsive timing circuit for regulating the speed of operation of said shutter to define an exposure interval in correspondence with the light level of said photographic scene, said timing circuit including a switch arrangement responsive to movement of said aperture plate to its said third position for altering said circuit so as to change said correspondence between said interval and scene light level from a first sensitivity range providing relatively long exposure intervals, suitable for said fast film when said aperture plate is in its said first position and said slow film when said aperture plate is in its second position, to a second sensitivity range providing relatively short exposure intervals suitable for said fast film when said aperture plate is in its said third position;
    whereby said relatively fast and slow photographic films may be exposed under similar, relatively high scene light levels with said aperture plate in said first and second positions respectively and with said circuit in said first range, and said fast film may be exposed under relatively low scene light levels with said aperture plate in said third position and with said circuit in said second range of light level sensitivity.

2. The apparatus recited in claim 1 wherein said timing circuit includes an RC timing network having a light controlled variable resistor and first and second parallel connected capacitors in series with said variable resistor, said first capacitor having a relatively large capacitance and said second capacitor having a relatively small capacitance, and said switch arrangement being operable responsive to movement of said aperture plate to its said third position to disconnect said first capacitor from said variable resistor and thereby alter the light level timing response of said RC timing network.

3. The apparatus recited in claim 2 wherein said switch arrangement is a normally closed switch and said aperture plate includes a depending lug operable to engage and open said switch when said aperture plate is moved to its said third position.

4. The apparatus recited in claim 2 including a series circuit having a fixed resistance and a normally open switch arrangement connected in parallel with said variableresistance and responsive to coupling of a flash device to said camera for closing said normally open switch arrangement to thereby connect said fixed resistance in series with said first and second parallel capacitors.

5. The apparatus recited in claim 1 wherein said housing is formed having a slot opening therein and further including an elongated slide member for supporting said aperture plate, said slide member having a button projecting through said slot, and position indicating indicia presented on the exterior of said housing adjacent said slot to indicate the respective positions of said aperture plate in accordance with the position of said button relative to said indicia, said timing circuit includes an RC timing network having a light controlled variable resistor and first and second parallel connected capacitors in series with said variable resistor said first capacitor having a relatively large capacitance and said second capacitor having a relatively small capacitance, said switch arrangement including a normally closed switch in series with said first capacitor and said variable resistor, and said slide member being configured for engaging and opening said switch when said plate is moved to its said third position thereby disconnecting said first capacitor from said variable resistor and changing said circuit from said first to said second range.

6. The apparatus recited in claim 5 wherein said slide member includes a depending lug for actuating said switch when said aperture plate is moved to its said third position.

7. In an exposure control system for photographic cameras having a shutter housing with a front wall mounting an objective lens, an externally accessible aperture plate mechanism slideable within the housing between a first position providing a reduced diaphragm stop and a second position providing a maximum relative lens aperture thereby providing an identical exposure parameter respectively for high and low speed films under the same scene light levels, a shutter, and a light sensitive circuit means having an RC timing network including a photoconductive cell exposed through the front housing wall to vary the operating speed of the shutter in accordance with the light level of the scene to be photographed, the improvement comprising:
    means for mounting said aperture plate mechanism for movement to a third position also providing said maximum relative lens aperture; and
    a switch engageable by said aperture plate mechanism in said third position to shift the light level exposure sensitivity of said circuit for proper exposure of said high-speed film at said maximum relative lens aperture under relatively dim levels of scene illumination.

8. The apparatus recited in claim 7 wherein said timing network includes a parallel capacitance circuit having a first capacitor of relatively large capacitance and a second capacitor of relatively small capacitance, said capacitance circuit being connected in series with the photoconductive cell of the RC timing network, said switch being a normally closed switch in series with said first capacitor and said cell, and said aperture plate mechanism includes means for opening said normally closed switch when said aperture plate mechanism is moved to said third position.

* * * * *